(12) United States Patent
Hsieh

(10) Patent No.: US 6,990,995 B2
(45) Date of Patent: Jan. 31, 2006

(54) VALVE-LEAF PROTECTIVE STRUCTURE FOR PRESSURE FOR REGULATOR OF AIR TANK USED IN DIVING

(76) Inventor: Hsing-Chi Hsieh, No. 51, Wan An Street, Taipei (TW)

( * ) Notice: Subject to any disclaimer, the term of this patent is extended or adjusted under 35 U.S.C. 154(b) by 314 days.

(21) Appl. No.: 10/635,800

(22) Filed: Aug. 5, 2003

(65) Prior Publication Data

US 2004/0055647 A1    Mar. 25, 2004

(30) Foreign Application Priority Data

Sep. 24, 2002    (TW) .............................. 091215120

(51) Int. Cl.
*B63C 11/02*    (2006.01)

(52) U.S. Cl. ................. 137/382; 137/908; 128/200.29; 128/204.26

(58) Field of Classification Search ................ 137/382, 137/527, 527.8, 908; 128/200.29, 204.26
See application file for complete search history.

(56) References Cited

U.S. PATENT DOCUMENTS

| | | | |
|---|---|---|---|
| 4,784,129 A * | 11/1988 | Garraffa ................ | 128/200.29 |
| 4,796,618 A * | 1/1989 | Garraffa ................ | 128/204.26 |
| 5,127,398 A * | 7/1992 | Stone ..................... | 128/204.26 |
| 5,558,466 A * | 9/1996 | Kuo et al. ............. | 128/200.29 |
| 6,718,976 B1 * | 4/2004 | Matsuoka .............. | 128/204.26 |
| 2002/0134385 A1 * | 9/2002 | Pietrelli ................. | 128/204.26 |

FOREIGN PATENT DOCUMENTS

EP    1243503 A2 *    9/2002    ............ 128/200.29

* cited by examiner

*Primary Examiner*—John Rivell
(74) *Attorney, Agent, or Firm*—Pro-Techtor Int'l Services

(57) ABSTRACT

A valve-leaf protective structure for pressure regulator of air tank used in diving mainly includes a valve-leaf seat being provided at a lower center with a retaining hole and at two sides with two raised supports, each of which is provided at an upper inner surface with a rotary shaft hole; and a valve-leaf protective cover located between the two raised supports of the valve-leaf seat, and provided at two upper outer ends with two sideward projected rotary shafts for rotatably mounted in the two rotary holes on the raised supports. A lower side of the protective cover is formed into a tongue having a hook provided at a lowermost end thereof to detachably engage with the retaining hole at the lower center of the valve-leaf seat. Therefore, the protective cover may be pivotally turned about the rotary shafts between the raised supports to close or open the valve-leaf seat.

5 Claims, 6 Drawing Sheets

VALVE-LEAF PROTECTIVE STRUCTURE FOR PRESSURE FOR REGULATOR OF AIR TANK USED IN DIVING

FIELD OF THE INVENTION

The present invention relates to a valve-leaf protective structure for pressure regulator of air tank used in diving that is easy to assembly to and disassemble from the pressure regulator, and very practical for use.

BACKGROUND OF THE INVENTION

A pressure regulator of air tank used in diving typically includes a rubber diaphragm, a lever, a spring, an air supply valve, a one-way valve leaf, etc., and has an outer case generally made of a rigid plastic material. When a diver inhales, air inside the pressure regulator decreases to cause reduction of internal pressure of the regulator, and the rubber diaphragm on the pressure regulator is forced by external pressure to bend inward and therefore presses against the lever, causing the lever to pull the spring and open the air supply valve. When the air supply valve is opened, air in the air tank is sent to the diver.

On the other hand, when the diver exhales, air pressure inside the regulator increases to push the rubber diaphragm outward, and the lever is moved to a normal position to release the spring and close the air supply valve. The exhaled air is discharged from the regulator via the one-way valve leaf.

The above-mentioned one-way valve leaf is mounted in a valve-leaf seat formed on the outer case of the pressure regulator. A protective cover is fitted onto the valve-leaf seat to protect the one-way valve leaf. The one-way valve leaf is a thin rubble sheet and plays an important role in the pressure regulator of the air tank for diving. To ensure the valve leaf to function in a normal manner, and to avoid the valve leaf from damage due to external force acted thereon, aging, or insufficient repair or maintenance, it is necessary to periodically maintain, clean, or replace the valve leaf. To do so, it is necessary to open the valve-leaf protective cover to expose the valve leaf. And, the valve-leaf protective cover must be closed again when the maintenance or replacement is completed.

FIGS. 1 and 2 are perspective views of a first conventional pressure regulator 1 of air tank used in diving with a valve-leaf protective cover 15 disassembled from and assembled to the pressure regulator 1, respectively. The pressure regulator 1 has an outer case, on which a valve-leaf seat 11 is formed for a one-way valve leaf 4 to mount therein. The valve-leaf seat 11 is provided at two lateral sides with two raised supports 12. Two shaft holes 13 are separately provided on the two raised supports 12 to locate at the same axial direction. A space 14 is defined between the two raised supports 12. A valve-leaf protective cover 15 having a configuration corresponding to that of the space 14 is positioned over the space 14. The valve-leaf protective cover 15 is provided with a shaft hole 16 to align with the two shaft holes 13 on the raised supports 12, so that a shaft 17 may be extended through the shaft holes 13 and 16 to connect the protective cover 15 to the valve-leaf seat 11 between the two raised supports 12 to protect the one-way valve leaf 4.

The shaft 17 must have a length and diameter closely matching with a distance between the two shaft holes 13 and a diameter of the shaft holes 13, 16. When the shaft 17 is too thick or too long, it is uneasy to mount it into the shaft holes 13, 16. And, when the shaft 17 is too thin or too short, it tends to move in and fall out of the shaft holes 13, 16. To maintain, clean, or replace the valve leaf 4, an elongate tool is required to remove the shaft 17 from the shaft holes 13, 16 before the protective cover 15 can be disassembled from the valve-leaf seat 11. It is very troublesome and time-consuming to do so. Moreover, the dismounted shaft 17 and protective cover 15 are fully separated from the pressure regulator 1 and therefore must be handled with special care to avoid missing thereof.

FIGS. 3 and 4 are perspective views of a second conventional pressure regulator 2 of air tank used in diving with a valve-leaf protective cover 25 disassembled from and assembled to the pressure regulator 2, respectively. The pressure regulator 2 has an outer case, on which a valve-leaf seat 21 is formed for a one-way valve leaf 4 to mount therein. The valve-leaf seat 21 is provided at an upper edge near two lateral sides with two projections 22, and at a lower edge near lateral sides with two symmetrically outward turned lips 23. The valve-leaf seat 21 has an open top 24 to which the valve-leaf protective cover 25 is closed. The protective cover 25 is provided at an upper rear surface with two retaining holes 26 corresponding to the two projections 22 on the valve-leaf seat 21. To assemble the protective cover 25 to the valve-leaf seat 21, first engage with the projections 22 with the retaining holes 26, and then apply a force to a lower part of the protective cover 25 to close it onto the valve-leaf seat 21, such that the outward turned lips 23 on two lateral sides of the seat 21 are pressed against two bubble outlets 27 provided at two lateral sides of the protective cover 25. In this manner, the valve-leaf protective cover 25 may be firmly connected to the valve-leaf seat 21 to protect the one-way valve leaf 4.

To maintain, clean, or replace the valve leaf 4, a driver or other suitable tool is required to pry the lips 23 of the valve-leaf seat 21 off the bubble outlets 27 of the protective cover 25, disengage the projections 22 from the retaining holes 26, and then remove the protective cover 25 from the seat 21. It is still troublesome and time-consuming to disassemble the protective cover 25 from the valve-leaf seat 21. And, the dismounted protective cover 25 is completely separated from the pressure regulator 2 and subjected to undesired missing thereof.

SUMMARY OF THE INVENTION

A primary object of the present invention is to provide a valve-leaf protective structure for pressure regulator of air tank used in diving to eliminate drawbacks existed in the conventional valve-leaf protective structures.

To achieve the above and other objects, the valve-leaf protective structure according to the present invention mainly includes a valve-leaf seat being provided at a lower center with a retaining hole and at two sides with two raised supports, each of which is provided at an upper inner surface with a rotary shaft hole; and a valve-leaf protective cover located between the two raised supports of the valve-leaf seat, and provided at two upper outer ends with two sideward projected rotary shafts for rotatably mounted in the two rotary holes on the raised supports. A lower side of the protective cover is formed into a tongue having a hook provided at a lowermost end thereof to detachably engage with the retaining hole at the lower center of the valve-leaf seat. Therefore, the protective cover may be pivotally turned about the rotary shafts between the raised supports to close or open the valve-leaf seat.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
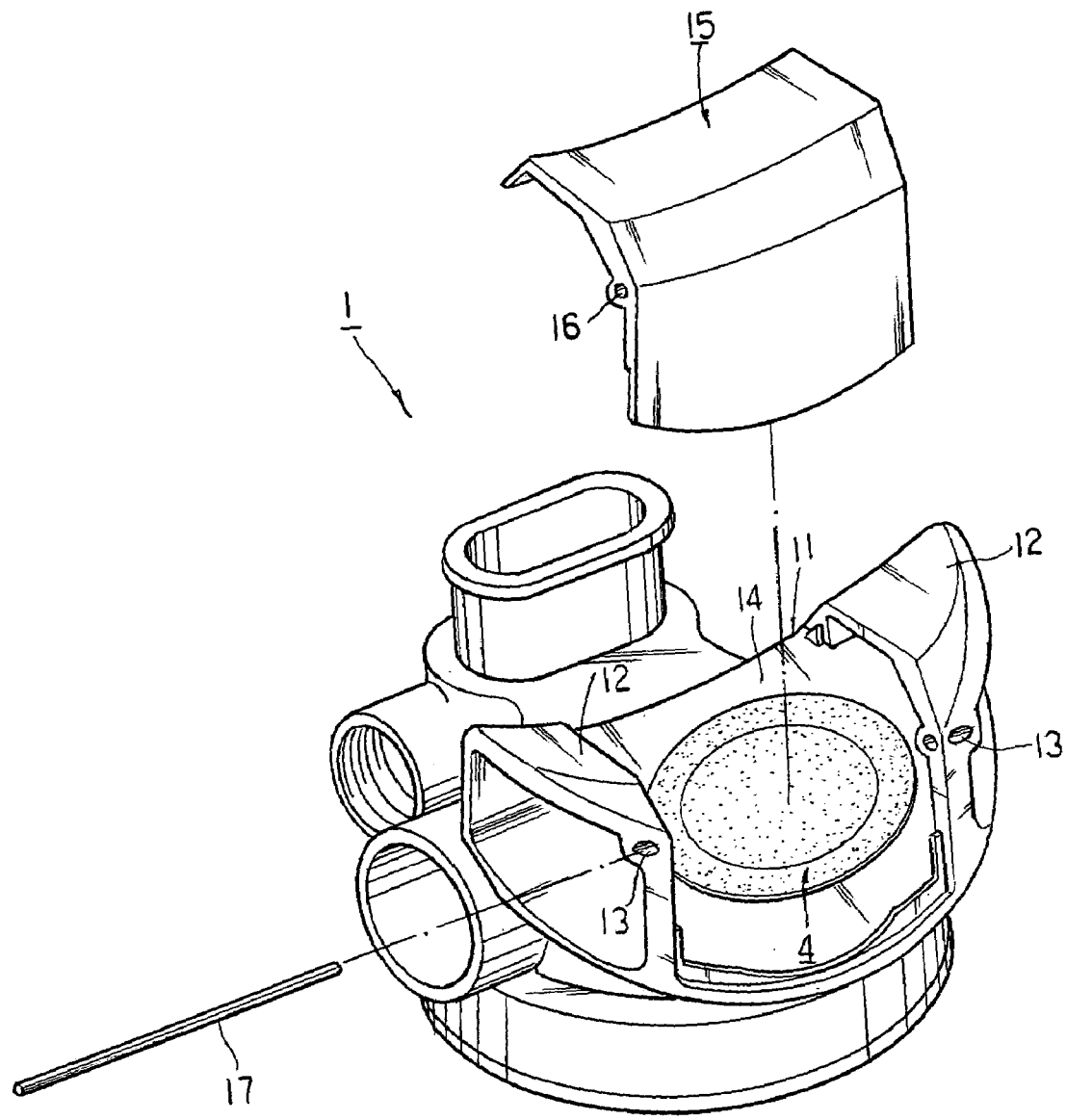
FIG. 1 is a perspective view of a first conventional pressure regulator for air tank used in diving with a valve-leaf protective cover disassembled therefrom.
Figure 2:
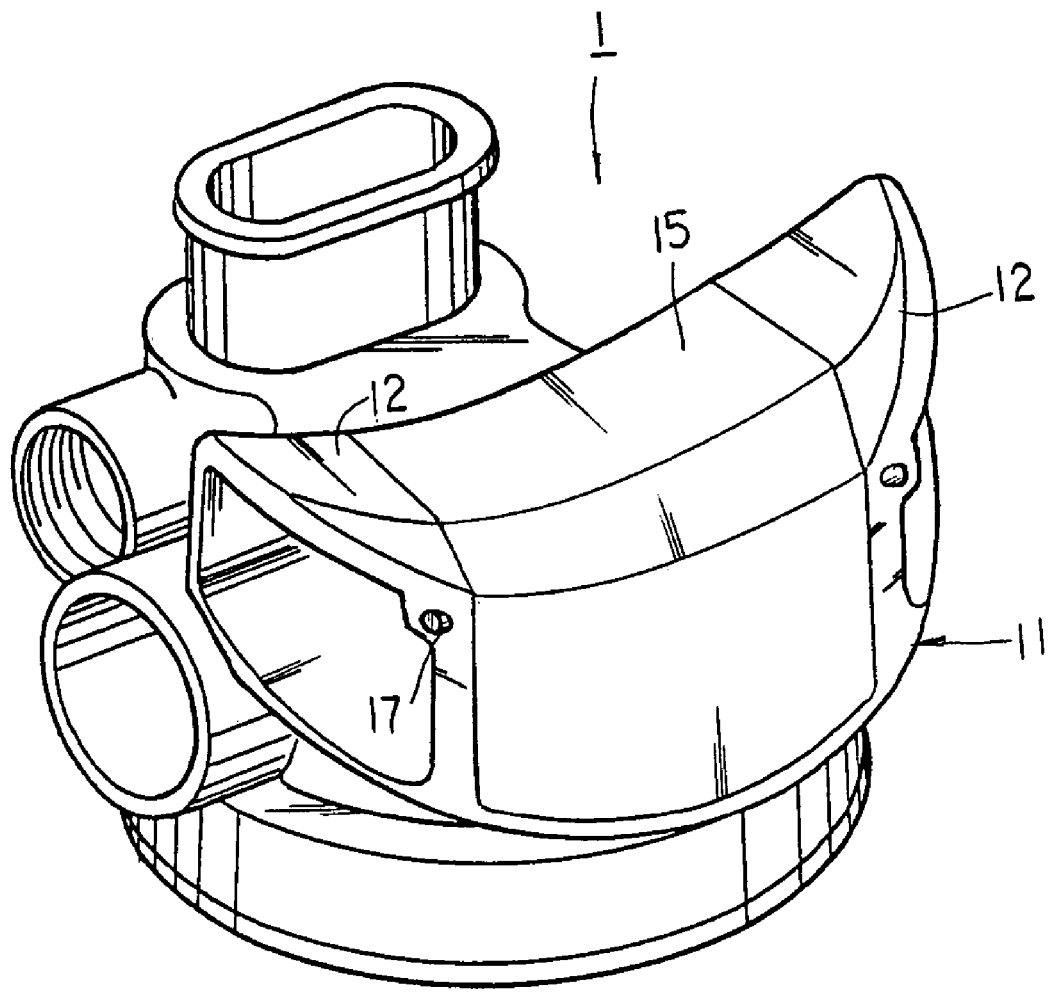
FIG. 2 is an assembled perspective view of FIG. 1.
Figure 3:
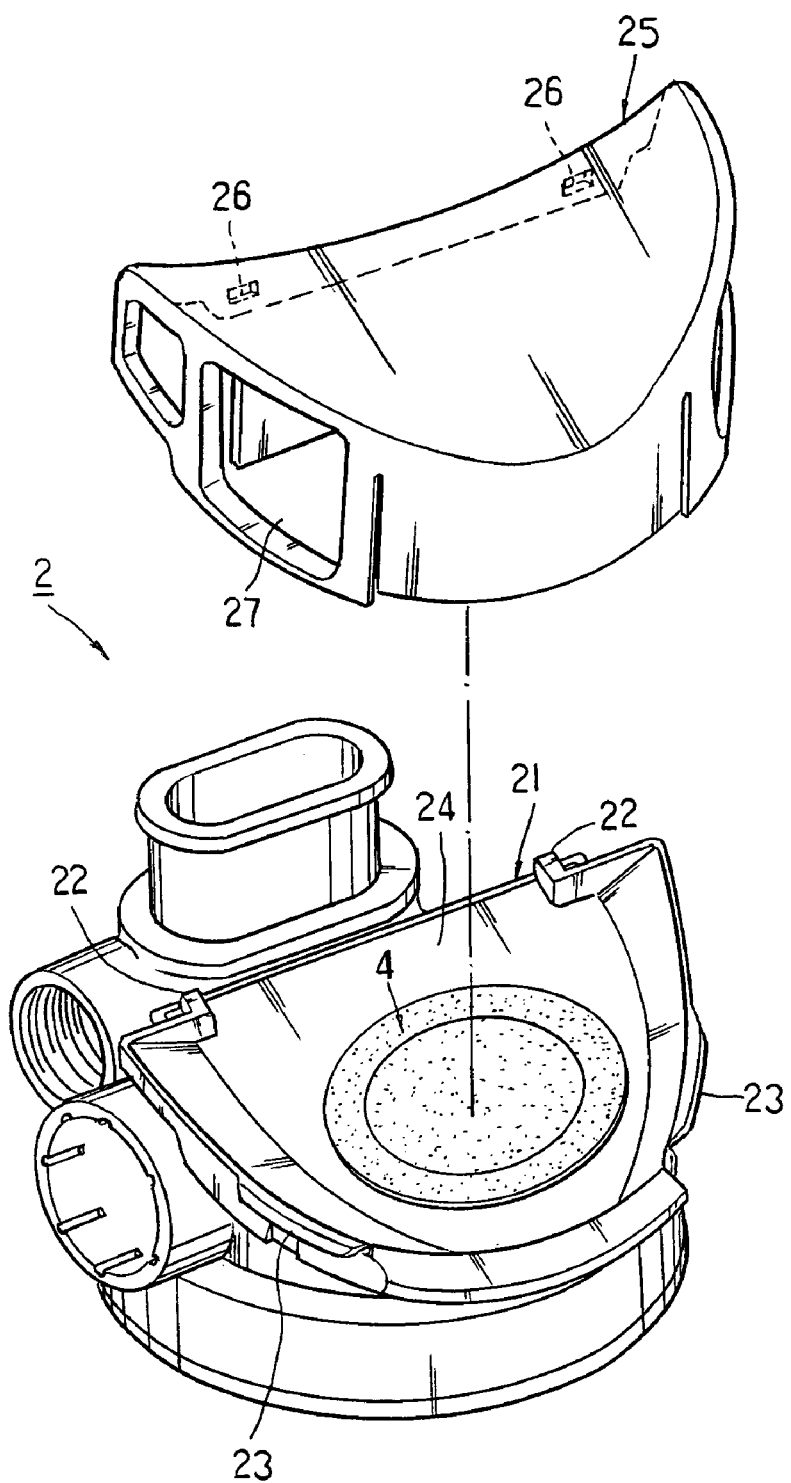
FIG. 3 is a perspective view of a second conventional pressure regulator for air tank used in diving with a valve-leaf protective cover disassembled therefrom.
Figure 4:
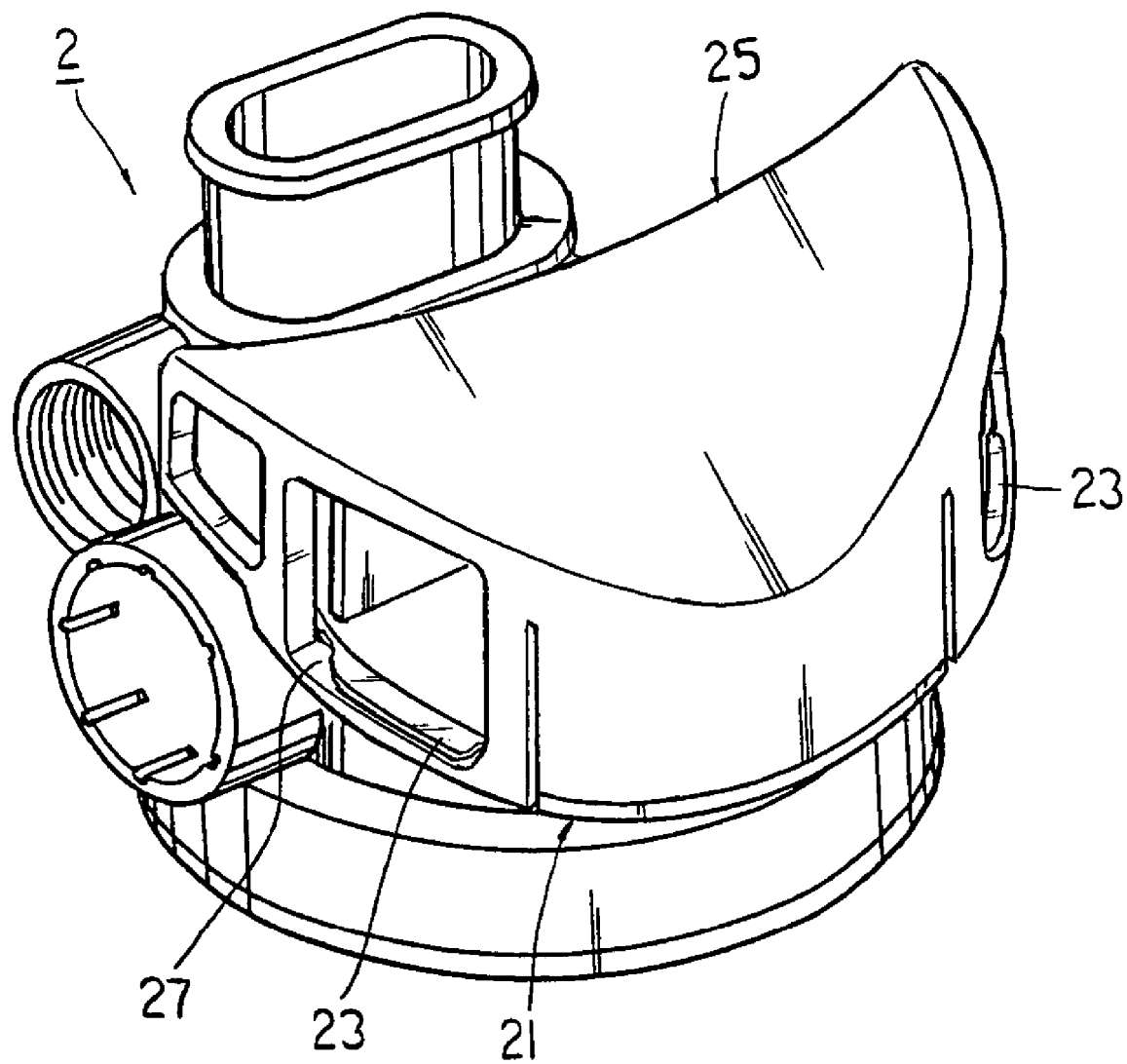
FIG. 4 is an assembled perspective view of FIG. 3.
Figure 5:
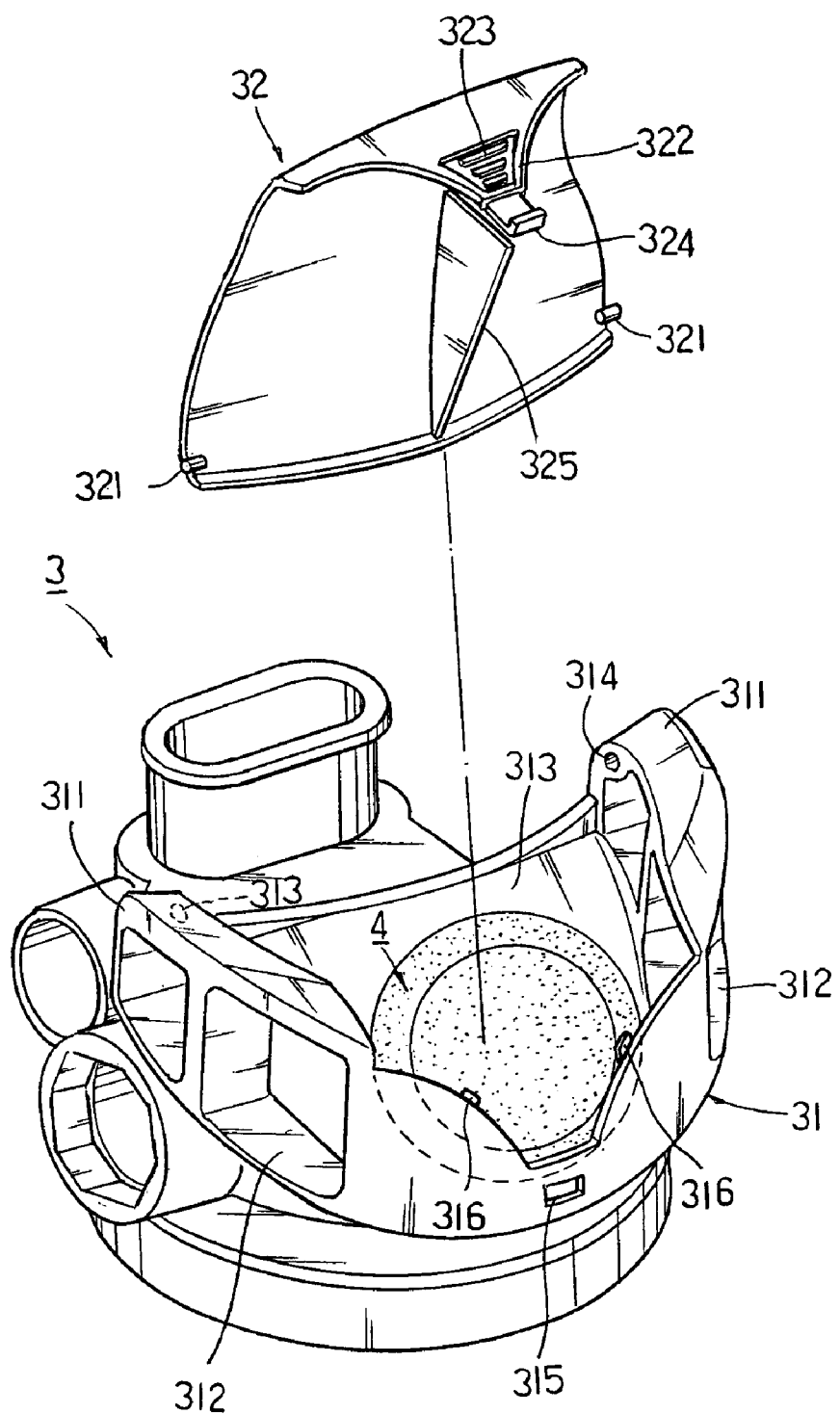
FIG. 5 is a perspective view of a pressure regulator for air tank used in diving with a valve-leaf protective cover according to the present invention disassembled therefrom.
Figure 6:
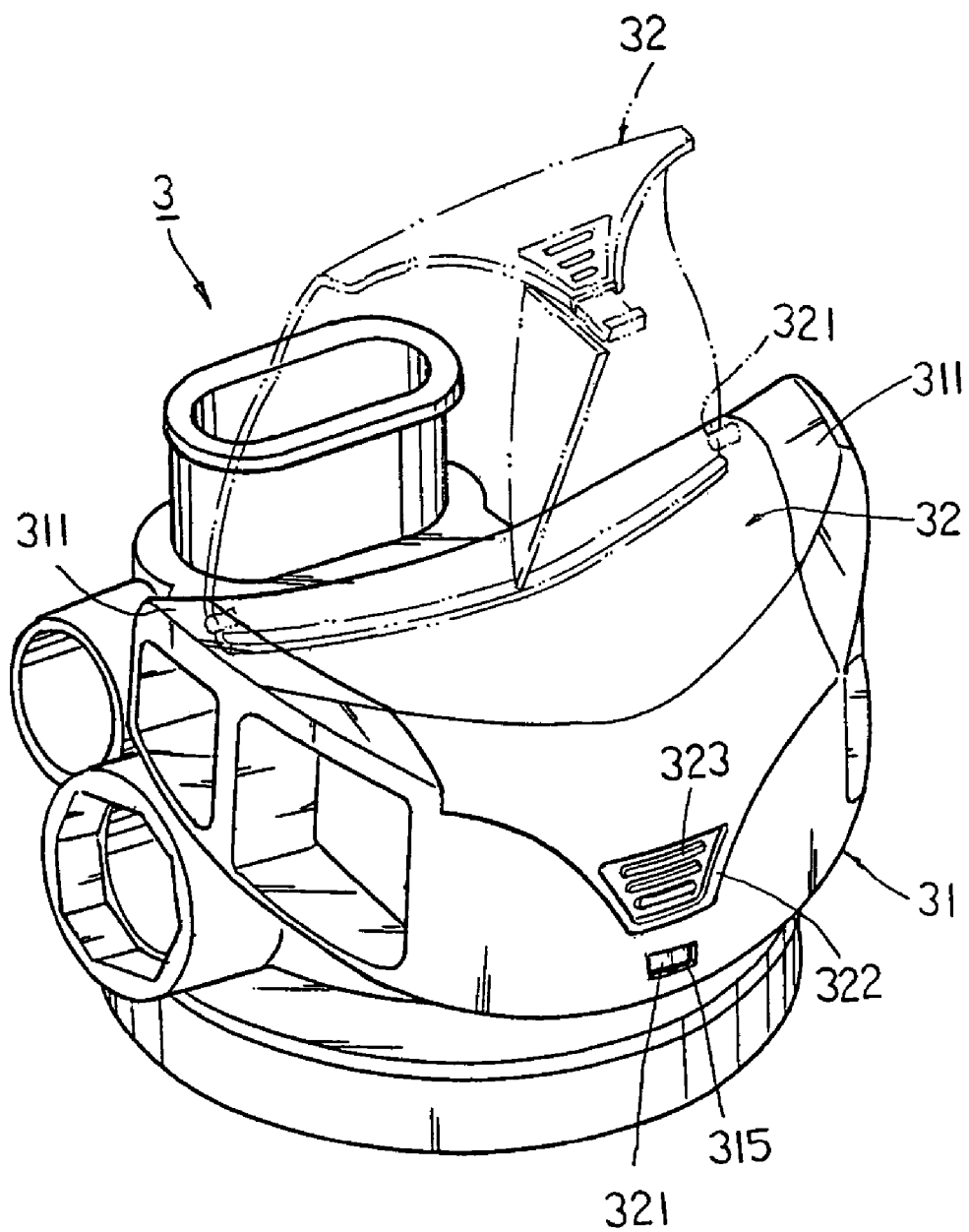
FIG. 6 is an assembled perspective view of FIG. 5.

Please refer to FIGS. 5 and 6 that are perspective views of a pressure regulator 3 for air tank used in diving with a valve-leaf protective cover 32 disassembled from and assembled to a valve-leaf seat 31, respectively. As shown, the valve-leaf protective structure of the present invention includes a valve-leaf seat 31 that is formed on an outer case of the pressure regulator 3, and a valve-leaf protective cover 32 that is mounted on the valve-leaf seat 31.

A one-way valve leaf 4 is mounted at a central area of the valve-leaf seat 31. The valve-leaf seat 31 is provided at two lateral sides with two raised supports 311, on which a plurality of bubble outlets 312 are provided to guide air exhaled by a diver to two sides of the diver without ascending in front of the diver's face to adversely affect the diver's sight. A space 313 is defined between the two raised supports 311. The two raised supports 311 are correspondingly provided at respective upper inner surface with a rotary shaft hole 314. A retaining hole 315 is provided at a lower center of the valve-leaf seat 31.

The valve-leaf protective cover 32 is configured for closing the space 313 between the two raised supports 311, and is provided at two upper outer ends with two sideward projected round stabs 321 to serve as two rotary shafts for rotatably mounted in the two rotary shaft holes 314 on the two raised supports 311, so that the valve-leaf protective cover 32 may be freely pivotally turned about the two stabs 321 between and relative to the raised supports 311 to open or close the space 313 on the valve-leaf seat 31. A lower side of the protective cover 32 is formed into an elastic tongue 322, on an outer surface of which there is provided with an anti-slip area 323 to provided increased frictional contact with a user's hand to facilitate easy push of the tongue 322 by the user. Moreover, the tongue 322 is provided at a lowermost end with a hook 324 for detachably engaging with the retaining hole 315 provided on the valve-leaf seat 31. The valve-leaf protective cover 32 is provided at an inner surface with a rib 325 to increase the structural strength of the protective cover 32.

To assemble the protective cover 32 to the valve-leaf seat 31, first insert the two round stabs 321 at the two upper outer ends of the protective cover 32 into the two rotary shaft holes 314 on the two raised supports 311 of the valve-leaf seat 31, and then pivotally downward turn the protective cover 32 about the two round stabs 321 and lightly push the tongue 322 for the latter to retreat and locate at an inner side of the valve-leaf seat 31. When the tongue 322 is released from the push, it automatically restores to an outer position for the hook 324 to project into and engage with the retaining hole 315 at the lower center of the valve-leaf seat 31, and thereby closes the protective cover 32 to the valve-leaf seat 31. While the rib 325 at the inner surface of the protective cover 32 provides the protective cover with enhanced compression strength, a predetermined clearance is maintained between the rib 325 and the valve leaf 4 and the tongue 322 to avoid damage of the valve leaf 4 or the tongue 322 due to an overly large external force applied on the protective cover 32.

To maintain, clean, or replace the valve leaf 4, first downward push the tongue 322 of the protective cover 32 to disengage the hook 324 from the retaining hole 315 on the valve-leaf seat 31. Then, upward push the tongue 322 to pivotally turn the protective cover 32 about the stabs 321 and thereby expose the valve leaf 4 for maintenance or replacement thereof. The protective cover 32 may be easily mounted to or dismounted from the valve-leaf seat 31 to maintain, clean, or replace the valve leaf 4 without using any tool. Moreover, the protective cover 32 in an open position is kept connected to the valve-leaf seat 31 of the pressure regulator 3 without the risk of becoming lost.

In addition, the raised supports 311 of the valve-leaf seat 31 are provided at respective inner surface at positions corresponding to two sides of the tongue 322 with at least one inward projected stopper 316 for preventing the tongue 322 from overly retreating and becoming stuck when it is pushed toward the valve-leaf seat 31.

What is claimed is:

1. A valve-leaf protective structure for pressure regulator of air tank used in diving, comprising:
   a valve-leaf seat formed on an outer case of said pressure regulator for a one-way valve leaf to mount at a central area thereof, said valve-leaf seat being provided at two lateral sides with two raised supports, on which a plurality of bubble outlets are formed, and between which a space is defined; said raised supports being provided at upper inner surfaces with two rotary shaft holes, and said valve-leaf seat being provided at a lower center with a retaining hole; and
   a valve-leaf protective cover for mounting on said space defined between said two raised supports of said valve-leaf seat; said protective cover being provided at two upper outer ends with two sideward projected rotary shafts for rotatably mounted in said two rotary shaft holes on said two raised supports, and at a lower side with an elastic tongue having a hook formed at a lowermost end for engaging with said retaining hole on said valve-leaf seat.

2. The valve-leaf protective structure for pressure regulator of air tank used in diving as claimed in claim 1, wherein said tongue on said protective cover is provided at an outer surface with an anti-slip area.

3. The valve-leaf protective structure for pressure regulator of air tank used in diving as claimed in claim 1, wherein said protective cover is provided at an inner surface with a rib.

4. The valve-leaf protective structure for pressure regulator of air tank used in diving as claimed in claim 2, wherein said protective cover is provided at an inner surface with a rib.

5. The valve-leaf protective structure for pressure regulator of air tank used in diving as claimed in claim 1, wherein said raised supports of said valve-leaf seat are provided on respective inner surface at positions corresponding to two sides of said tongue of said protective cover with at least one inward projected stopper.

* * * * *